United States Patent
Budd

(10) Patent No.: US 6,475,938 B1
(45) Date of Patent: *Nov. 5, 2002

(54) METHOD OF FORMING A GLASS CERAMIC MATERIAL

(75) Inventor: Michael Budd, Porsgrunn (NO)

(73) Assignee: Norsk Hydro ASA, Oslo (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,671
(22) PCT Filed: Jul. 2, 1997
(86) PCT No.: PCT/NO97/00169
§ 371 (c)(1),
(2), (4) Date: Jan. 3, 2000
(87) PCT Pub. No.: WO98/46540
PCT Pub. Date: Oct. 22, 1998

(30) Foreign Application Priority Data

Apr. 14, 1997 (NO) ................................................ 971714

(51) Int. Cl.⁷ ............................................... C03C 10/04
(52) U.S. Cl. .............................. 501/5; 501/14; 501/15; 501/21; 501/32; 65/33.1
(58) Field of Search ............................... 501/5, 14, 15, 501/21, 32; 65/33.1, 33.7, 33.9

(56) References Cited

U.S. PATENT DOCUMENTS

| 2,920,971 | A | * | 1/1960 | Stookey | |
| 3,157,522 | A | * | 11/1964 | Stookey | |
| 3,778,242 | A | * | 12/1973 | Francel et al. | 65/43 |
| 3,881,944 | A | * | 5/1975 | Beall et al. | |
| 4,256,796 | A | * | 3/1981 | Hang et al. | 428/210 |
| 4,385,127 | A | * | 5/1983 | Chyung | 501/5 |
| 4,965,229 | A | * | 10/1990 | Nishino et al. | 501/14 |
| 5,250,360 | A | * | 10/1993 | Andrus et al. | 428/471 |
| 5,786,286 | A | * | 7/1998 | Kihli | 501/8 |
| 5,910,459 | A | * | 6/1999 | Beall et al. | 501/8 |
| 6,017,642 | A | * | 1/2000 | Kumar et al. | 501/5 |

FOREIGN PATENT DOCUMENTS

| GB | 946859 | | 1/1964 |
| JP | 61-219741 | * | 9/1986 |

\* cited by examiner

Primary Examiner—Karl Group
(74) Attorney, Agent, or Firm—Wenderoth, Lind & Ponack, L.L.P.

(57) ABSTRACT

The present invention relates to glass ceramic material and its use as means for joining different types of material and as support. Said glass ceramic material comprising, on a weight percent basis, 10–35% MgO, 10–55% BaO and 25–50% $SiO_2$ and is formed by the following steps: a) melting of glass raw material at a temperature in excess of 1450° C. and that the thereby formed melt is cooled rapidly to a temperature below 900° C. and thereafter to ambient temperature to form a precursor glass, b) milling of the precursor glass into a sinterable glass powder with an average particle size in the range of 1 micron to 100 microns, c) forming of the glass powder into a green body of suitable shape, with or without organic processing aids, and subjecting said green body to a thermal treatment comprising a heating stage of average heating rate not exceeding 100° C./minute between the temperatures of 750° C. and 900° C.

9 Claims, No Drawings

METHOD OF FORMING A GLASS CERAMIC MATERIAL

This application is a 371 application of PCT/NO97/00169 filed Jul. 2, 1997.

The present invention relates to a self-supporting glass-ceramic material possessing high softening temperature (~1000° C. or above) and a thermal expansion coefficient in excess of $10 \times 10^{-6°}$ $C.^{-1}$ (20–950° C.).

The invention further comprises use of the glass ceramic material for joining different types of material.

There are many technologically important applications where the special properties of ceramic materials are utilised, e.g. to provide electrical insulation, wear resistance, stability against oxidation etc. Frequently these ceramics are used in direct combination with other materials with very different physical properties, and they are often required to operate at high temperatures. In applications where a ceramic component is joined rigidly to a dissimilar material and the assembly is subject to temperature changes after the joining operation, there is a strong need to match the thermal expansion characteristics of the two materials. Failure to do so will reduce the reliability of the joint and will often lead to fracture.

Glass-ceramics, a class of materials produced by the controlled crystallisation of vitreous precursors, have proved particularly successful when employed in applications where they are bonded directly to other materials, primarily due to the ease with which their thermal expansion coefficients can be tailored to match a diverse range of substrate materials. As a general rule, though, the glass-ceramics with high thermal expansion coefficients (CTE) (above $10 \times 10^{-6°}$ $C.^{-1}$) (20–950° C.) are limited in terms of their maximum temperature of application because they soften at relatively low temperatures, often below 850° C. This is especially true for glass-ceramics with high coefficients of thermal expansion which are commonly used for sealing to stainless steels and other metals with moderate to high expansion such as those based on the $Li_2O$—$SiO_2$ or $Li_2O$—$ZnO$—$SiO_2$ systems.

There are some applications, however, where both high thermal expansion coefficient and high softening temperature (~1000° C. or above) are required in combination with excellent oxidation/reduction resistance in various atmospheres. In particular, there is a demand for this combination of properties within the field of high temperature electrochemical cells, e.g solid oxide fuel cells (SOFCs), oxygen separators operating with oxygen ion conducting ceramic membranes etc. In addition to the requirements regarding expansion and chemical stability, there is usually also a need for good microstructural stability and low electrical conductivity at the operating temperature.

The use of porous, oxide-based supports for gas-separation membranes is generally known, and supports based on alumina, silica and microporous glass (e.g. Vycor®) are available commercially and have been widely used, as referred to in EP 0 515 936 A1. These porous support materials, however, are designed to support thin (<5 μm) membranes which themselves contain micropores up to a few nanometers in diameter and which separate gases by a physical filtering process. The inherent microstructural instability of these membrane materials with extremely small pores imposes an upper temperature limit of about 500° C. on their operation, since above this temperature pore collapse is possible. The thermal stability of the membrane support material at temperature above 500° C. is therefore irrelevant in this particular application area. In addition, the requirement of matching the thermal expansion of the support to that of the membrane is far less stringent because the membrane is so thin and because the highest operating temperature is limited to ~500° C.

In other disclosures, e.g. U.S. Pat. Nos. 2,920,971 and 3,157,522 and GB Patent 1,402,960, porous glass-ceramic bodies with good thermal stability at temperatures as high as 1400° C. are described. The materials of these inventions are intended for use as catalyst supports, with particular application in vehicle exhaust control systems. These materials are required to have very high resistance to thermal shock and are therefore based on glass-ceramics with low thermal expansion coefficients, with cordierite, celsian, β-spodumene and mullite as the preferred crystal phases. Although the refractoriness of these glass-ceramic supports is excellent, they are not suitable for use in contact with dense, ion/electron conducting ceramic membranes because of the severe mismatch in thermal expansion coefficients.

High expansion glass-ceramics based on the MgO—BaO—$SiO_2$—$B_2O_3$ are described by Chyung in U.S. Pat. No. 4,385,127 and by Hang et al. in U.S. Pat. No. 4,256,796. The application of these materials, however, is restricted to insulating or protective coatings on metal alloy substrates. The glass-ceramics described by Chyung and by Hang et al. have boron oxide contents of at least 5% by weight. High expansion glass-ceramics with improved refractoriness are described by Andrus & MacDowell in U.S. Pat. No. 5,250,360. These are essentially based on the barium silicate and strontium silicate systems with various oxide additions, but with little or no $B_2O_3$ or alkali metal oxides such as $Na_2O$ and $K_2O$. In the invention of Andrus & MacDowell the application of the glass-ceramics is again limited to the coating of metal alloy substrates to provide protection from oxidizing atmospheres and a barrier to heat transport. One important feature of the glass-ceramics described by Andrus & MacDowell is that cristobalite forms in the glass-ceramic coating immediately adjacent to the metal alloy interface, as this is found to enhance coating quality.

The main object of the present invention is to obtain solid, self-supporting glass-ceramic materials with a combination of high thermal expansion coefficient (above $10 \times 10^{-6°}$ C.)(20–950° C.) and high softening temperatures (~1000° C. or above).

Another object of the present invention is to obtain glass-ceramic material with level of open porosity tailored to suit specific modes of application.

A further object of the invention is to obtain glass ceramic material suited for use as means for joining different type of material.

A further object of the invention is to obtain glass-ceramic material suited for use in combination with dense, ion/electron conducting ceramic membranes where the operating temperatures are typically 800–1000° C. and where there is a strong need to match the high thermal expansion coefficient of the membrane material.

The inventor found that by processing certain glass raw materials according to a selected route, a glass ceramic material having the properties mentioned above could be obtained.

The glass-ceramics of this invention are formed by the controlled sintering and crystallisation of glass powders from the MgO—BaO—$SiO_2$ system, and in being produced by a powder route, they are amenable to many of the processing techniques employed in ceramic engineering, such as isostatic pressing, tape casting, extrusion, injection moulding etc. The applicability of existent forming technology means that fabrication of relatively large and if necessary, intricately shaped components is possible with these materials.

The glass-ceramics of the present invention have compositions on a weight percent basis in the general range 10–35% MgO, 10–55% BaO and 25–50% $SiO_2$. Additionally, the glass-ceramic may contain up to 5% $B_2O_3$ and up to 15% of other metal oxides and other components known in the field of glass ceramics such as fluorides, nitrides etc. The major crystal phases developed in these glass-ceramics are magnesium barium silicate ($2MgO.BaO.2SiO_2$) and enstatite ($MgO.SiO_2$). The magnesium barium silicate phase ($2MgO.BaO.2SiO_2$) is considered to be responsible for the high thermal expansion coefficient, in particular at temperatures above 700° C.

The preferred composition for these high expansion glass-ceramics lies within the range 12–30% by weight of MgO, 15–50% by weight of BaO and 30–45% by weight of $SiO_2$ with up to 3% by weight of $B_2O_3$ and up to 15% by weight of other metal oxides and suitable glass ceramic components such as fluorides, nitrides etc.

The process for forming the magnesium barium silicate glass-ceramics can be divided into following parts:

1) Melting of the Glass-components and Cooling to Produce Solid Precursor Glass Suitable for Pulverisation The raw materials should be mixed evenly to produce a homogeneous batch. The glass batch should be heated in a suitable container to a temperature in excess of 1450° C., and preferably a temperature in excess of 1500° C. for a period of time sufficient to ensure that complete melting is obtained. Steps may be taken at this stage to improve the homogeneity of the melt (e.g. by stirring, passing bubbles through the melt or by quenching, crushing and remelting). The molten glass should be cooled rapidly to a temperature below 900° C. and thereafter to ambient temperature. Preferably the molten glass is quenched directly into cold water to produce glass frit/precursor glass, which, when dry, is easily broken down during milling. Many of the precursor glasses are very unstable and even on quenching into water tend to show some degree of devitrification. It has been found that a small amount of devitrification in the glass frit can be tolerated without adversely affecting the sintering behaviour, but care should be taken to limit the degree of uncontrolled devitrification as far as possible.

2) Reduction of Particle Size of the Precursor Glass to Produce a Sinterable Powder Virtually any comminution technique is applicable for the pulverisation of the precursor glass. The degree to which the particle size is reduced has been found to be very important in determining the porosity characteristics of the final material, so it is a processing stage which needs to be well controlled in order to arrive at the desired particle size distribution. It has been observed that acceptable sintering behaviour is obtained with an average particle size in the range 1 micron to 100 microns. It is preferable, however, to use glass powders with an average particle size between 2 microns and 50 microns. In the case where a dense glass-ceramic is required, reducing the average particle size below 1 micron can be detrimental as premature crystallisation and a consequent reduction in sintering efficiency can result, leading to a glass-ceramic with an increased level of porosity after heat-treatment. On the other hand, if the average particle size of the precursor glass powders is above 100 microns, the driving force for densification (i.e. reduction in surface area) is small, and the resulting glass-ceramics have coarse microstructures with large pores and they have poor mechanical properties.

3) Consolidation of the Powder to Form the Green Body

The forming of the glass powder into a green body can be achieved in many ways. Any consolidation or shaping technique which is applied in ceramic engineering is considered applicable, and the use of organic or other processing aids has been found to be beneficial but not essential. Typical techniques which might be employed to form the precursor glass powder into an appropriately shaped green body are pressing, cold isostatic pressing (CIP), tape casting, injection moulding, extrusion, etc.

4) The Thermal Treatment of the Green Body to Produce a Sintered Glass-ceramic Body Possessing a High Thermal Expansion Coefficient and a High Softening Temperature.

After forming, the green body is subjected to a controlled heat-treatment during which the glass powder sinters and crystallises to form the high expansion glass-ceramic. The rate of heating, the temperature of any holdings stages, the maximum temperature of heat-treatment, and the rate of cooling are all important parameters in determine the final properties of glass-ceramics. In particular, the rate of heating through the sintering range is critical as it has a very strong influence on the overall degree of sintering and also affects the ability of the powder compact to support itself during sintering.

In the case where organic processing aids have been used in the milling of the precursor glass powder or the shaping of the green body, the thermal treatment should be designed to allow the complete removal of these processing aids prior to the commencement of sintering. This would normally involve slow heating (e.g. <2° C./min) in an oxygen containing atmosphere to a temperature above 300° C., and preferably above 400° C.

The powder compact should be heated through the temperature range 750° C. to 900° C. at an average heating rate not exceeding 100° C./minute in order to initiate controlled sintering whilst avoiding undue deformation. This stage clearly differentiates the glass-ceramics according to the present invention from those of overlapping composition which are applied as coatings on metals (e.g. U.S. Pat. No. 5,250,360) since these are required to be heated rapidly in order to achieve good flow and wetting of the metal alloy substrate. Holding at a temperature within the range 750° C. to 900° C. to optimise sintering is optional. Normally, though not essentially, the material is then heated to a temperature in excess of 900° C. for a period of time sufficient to ensure that a degree of crystallisation of at least 50 vol % has been attained. During this time at temperatures above 900° C. the purpose is to arrive at the desired crystalline phase constitution so as to give the required thermal expansion characteristics and, additionally to continue the sintering process such that the level of porosity has been reduced to the desired level. The sintered body is then cooled to room temperature at such a rate that damage arising from thermal shock is avoided.

Following thermal treatment, the glass-ceramic body can be machined to its final dimensions by conventional machining methods.

The processing procedures covered above are particularly suited to the formation of dense high expansion glass-ceramics.

In some applications such as those involving porous supports for dense ceramic membranes mentioned above, a controlled amount of porosity is desirable. Various methods are available in this class of material for the introduction of porosity. As mentioned above, the particle size of the precursor glass powder is a very important factor in determining the overall level of porosity. In particular, reduction of the glass powder to sub-micron sizes has been frequently observed to inhibit sintering and lead to glass-ceramics with interconnected porosity. This method, however, is not the preferred method as it is not easy to control, and its effectiveness varies from one material to another. A better method which was found was to make changes in the composition of the precursor glass in order to inhibit sintering. In this case, exclusion of oxides such as $Al_2O_3$, $B_2O_3$ and ZnO has been found to inhibit sintering and promote the generation of microstructures with interconnected porosity. In addition, inclusion of oxides such as CuO, $K_2O$ and NiO in small amounts (0–5 wt %) has been found to reduce the sinterability of the powders and often leads to glass-ceramics with open porosity. This method, however, also has some limitations since altering the chemistry of the precursor glass inevitably has an impact on its expansion characteristics, which in some instances can be undesirable. Yet another method of promoting porosity in these glass-ceramics is to heat very slowly (<2° C./min) through the temperature range where sintering and crystallisation occur, (i.e.750° C. to 900° C). This method is particularly effective for those materials which have the highest thermal expansion coefficients after heat-treatment since it is these which have been found to have the poorest sinterability.

A preferred method for controlling the degree of open porosity and the general scale of the porosity is the admixture of pre-crystallised glass-ceramic powder to the precursor glass powder prior to the formation of the green body. In this case the higher the proportion of pre-crystallised powder in the mixture, the poorer the sintering and higher the level of residual porosity in the heat-treated glass-ceramic. When used in combination with variation of the powder particle size to control the sinterability, this method has the advantage that both the scale and the degree of porosity can be altered. The mixing of pre-crystallised and glassy powders of the same composition gives the benefit that the expansion characteristics of the final material are largely independent of the degree of porosity.

The invention relates primarily to forming self-supporting glass-ceramic material possessing high softening temperature (~1000° C. or above) and a thermal expansion coefficient in excess of $10\times10^{-6}$ $C.^{-1}$ (20–950° C.) comprising, on a weight percent basis, 10–35% MgO, 10–55% BaO and 25–50% $SiO_2$ by the following steps:

a) melting of glass raw material at a temperature in excess of 1450° C. and that the thereby formed melt is cooled rapidly to a temperature below 900° C. and thereafter to ambient temperature to form a precursor glass, b) milling of the precursor glass into a sinterable glass powder with an average particle size in the range 1 micron to 100 microns, c) forming of the glass powder into a green body of suitable shape, with or without organic processing aids, and subjecting said green body to a thermal treatment comprising a heating stage of average heating rate not exceeding 100° C./minute between the temperatures of 750° C. and 900° C.

The preferred composition of the glass ceramic material, on weight percent basis is 10–35% MgO, 10–55% BaO and 25–50% $SiO_2$ and up to 5% $B_2O_3$ and possibly up to 15% of other metal oxides and suited glass ceramic components such as fluorides, nitrides etc.

In step b) in the formation of the above glass ceramic material the average particle size of the glass powder is preferably 2–50 microns.

Another embodiment is that a pre-crystallised glass powder having the same composition as the precursor glass powder is added to the precursor glass powder from step b) prior to formation of the green body and that the pre-crystallised glass powder is produced by heating a cooled precursor glass from step a) to a temperature in excess of 800° C. to initiate crystallisation, and then milled as in step b).

The green body in step c) is further heated to a temperature in excess of 900° C., preferably in excess of 1000° C., to attain a degree of crystallisation of at least 50 vol %.

Another embodiment of the invention is to use the glass ceramic material as means for joining different types of material having identical or different thermal expansion coefficients and use the glass ceramic material as a support material for an ion/electron conducting ceramic membrane.

The scope and special features of the invention are as defined by the attached claims.

The invention is further explained and envisaged in the following examples.

The chemical compositions of some of the precursor glass and glass-ceramics within the scope of this invention are given in Table 1 by way of example. The compositions are given as a weight percentage on an oxide basis.

TABLE 1

Compositions of MgO—BaO—$SiO_2$ Based Glass-Ceramics

| Glass no. | $SiO_2$ | MgO | BaO | ZnO | $B_2O_3$ | $Al_2O_3$ | SrO | $K_2O$ |
|---|---|---|---|---|---|---|---|---|
| 1 | 43.3 | 22.9 | 24.9 | 5.3 | 1.1 | 2.5 | | |
| 2 | 36.1 | 19.8 | 37.5 | 3.4 | 1.0 | 2.2 | | |
| 3 | 36.7 | 20.1 | 38.2 | 3.5 | 1.5 | | | |
| 4 | 35.4 | 19.4 | 36.8 | 3.4 | 2.9 | 2.1 | | |
| 5 | 38.9 | 23.1 | 31.2 | 3.7 | 1.8 | 1.5 | | |
| 6 | 41.2 | 26.4 | 24.4 | 3.9 | 1.7 | 2.4 | | |
| 7 | 45.5 | 30.6 | 13.2 | 2.8 | 1.8 | 6.1 | | |
| 8 | 38.3 | 21.2 | 31.4 | | 1.5 | 1.5 | 6.1 | |
| 9 | 38.2 | 16.8 | 34.5 | 4.7 | 1.1 | 2.1 | | 2.6 |
| 10 | 32.6 | 14.5 | 46.9 | 3.1 | 0.9 | 2.0 | | |
| 11 | 37.2 | 18.7 | 36.6 | 4.6 | | 2.9 | | |

EXAMPLE 1

This sample shows high expansion glass-ceramics which are processed in such a way that they are dense after heat-treatment; i.e. they have no open porosity. Examples of the thermal expansion characteristics of these materials after heat-treatment of powder compacts are presented in Table 2. The average particle size for the precursor glasses was 5–10 microns for all materials listed in Table 2.

TABLE 2

Thermal Expansion Characteristics of MgO-BaO-$SiO_2$ Based Glass Ceramics

| | Heat-treatment | | | | |
|---|---|---|---|---|---|
| Glass No | Heating Rate (500° C. to hold temp) | Holding Stage (Temperature/time) | Cooling Rate (Holding stage to <700° C.) | CTE [20–950° C.] $(10^{-8}$ °$C.^{-1})$ | Dilatometric Soft Point (° C.) |
| 1 | 6° C./min | 1100° C./1h | 10° C./min | 12.2 | 1040 |
| 1 | 6° C./min | 1000° C./1h | 10° C./min | 13.3 | 1020 |
| 2 | 12° C./min | 1100° C./1h | 10° C./min | 15.4 | 1020 |
| 3 | 12° C./min | 1100° C./1h | 10° C./min | 15.1 | 990 |
| 3 | 12° C./min | 1100° C./1h | 2° C./min | 16.2 | 1005 |
| 4 | 12° C./min | 1100° C./1h | 2° C./min | 13.3 | 950 |
| 5 | 6° C./min | 1100° C./1h | 2° C./min | 13.9 | 1010 |
| 6 | 6° C./min | 1100° C./1h | 2° C./min | 11.7 | 1035 |
| 7 | 12° C./min | 1100° C./1h | 2° C./min | 9.3 | 1100 |

TABLE 2-continued

Thermal Expansion Characteristics of MgO-BaO-SiO$_2$ Based Glass Ceramics

| | Heat-treatment | | | | |
|---|---|---|---|---|---|
| Glass No | Heating Rate (500° C. to hold temp) | Holding Stage (Temperature/time) | Cooling Rate (Holding stage to <700° C.) | CTE [20–950° C.] ($10^{-8}$ °C.$^{-1}$) | Dilatometric Soft Point (° C.) |
| 8 | 12° C./min | 1100° C./1h | 2° C./min | 12.8 | 1005 |
| 9 | 12° C./min | 1100° C./1h | 10° C./min | 16.4 | 1025 |
| 10 | 6° C./min | 1100° C./1h | 10° C./min | 14.7 | 970 |

The grain size of these glass-ceramics in table 2 is dependent on the particle size distribution of the precursor glass powders. Within the range examined, (i.e. average particle size of precursor glasses 5–10 microns) the glass ceramic grain size was found to be an average of 1–5 microns. The grain morphology was found to be predominantly lathe- or lens-like with an aspect ratio of 2–5, and the mechanical properties resulting from this type of microstructure were found to be moderate to good (>100MN·m$^{-2}$).

The sintering characteristics of the various precursor glass powders have been found to be sufficiently compatible to allow structures with graded expansion characteristics to be produced by co-sintering of different powders. In one such method components with graded thermal expansion coefficients were produced by cold (room temperature), uniaxial pressing in a cylindrical metal die. A combination of a polyacrylate binder and a chlorinated parafin plasticizer was added to the various precursor glass powders or mixtures thereof prior to pressing of the green body. Layers were built up individually in the die cavity, and each one was subjected to a uniaxial pressure of 125 MN·m$^{-2}$ prior to introduction of the powder of succeeding layer. Once all layers were in place, the laminate was subjected to an uniaxial pressure of 250 MN·m$^{-2}$ prior to removal from the die. The laminates were heat-treated to a temperature of 1100° C. for 1 hour and cooled at 2C./minute. Crack-free, graded expansion bodies covering the expansion range <10×10$^{-6}$ to >16×10$^{-6o}$ C.$^{-1}$ (20–950° C.) could be consistently produced where the increment in expansion coefficient between adjacent layers was maintained below 0.8×10$^{-6o}$ C.$^{-1}$ (20–950° C). The thickness of individual layers of the laminate was varied within the range of 0.5–1.5 mm without apparent influence in the incidence of cracking. Other methods of producing graded expansion components, such as dip coating and tape casting/lamination are equally applicable to these MgO—BaO—SiO$_2$ based glass-ceramics.

The successful use of these high expansion glass-ceramics as bonding media has been demonstrated in two ways. Taking high expansion ceramics such as stabilised zirconia, nickel oxide and the heat-treated glass-ceramics themselves as substrate materials. bonding trials were performed using glass-ceramics with appropriate expansion characteristics (closely matched in expansion coefficient or slightly lower in expansion). In the first method, the precursor glass powder was made up into a paste using a suitable organic suspending medium and applied directly between the surfaces to be joined. After drying, the joints were heat-treated at 12° C./minute up to a final temperature in the range 1000–1100° C. Joining was accomplished without the need to apply pressure between the surfaces to be bonded.

In the second method, thin glass powder preforms were placed between the surfaces to be bonded. These preforms were produced either by tape casting and cutting or by pressing thin layer from the precursor glass powder using a similar binder/plasticizer system to that used for fabrication of graded expansion components. Pressure, typically 10–20 kN.m$^{-2}$, was applied across the joint surfaces during the heat-treatment of these assemblies to aid bonding. The joints produced by each of these methods were found to have excellent mechanical properties, and were crack-free in the cases where the material of the bond had a similar or slightly lower expansion coefficient than the ceramic(s) which it was being used to join.

EXAMPLE 2

This example shows a high expansion glass ceramic with open porosity based on glass 11.

Glass 11, which contains no B$_2$O$_3$ (Table 1) was separated into two fractions prior to the milling stage of processing. One of these fractions was milled to yield a glass powder with an average particle size of 5–10 μm. The other fraction was crystallised by holding at 1050° C. for 1 hour prior to undergoing a similar milling operation. The two fractions were intimately mixed in various proportions and, with the aid of an polyacrylate binder, the thereby formed mixtures were pressed into pellets 13 mm in diameter and approximately 5 mm thick. After heating slowly to 500° C. to remove the polyacrylate binder, these pressed pellets were heated to 1100° C. at 12° C./min, held at this temperature for 1 hour and then cooled to below 500° C. at 10° C./min. Cooling from 500° C. to room temperature was at furnace rate. Measurements after heat-treatment revealed that the pellet produced entirely from the vitreous precursor powder had an open porosity of <2% whereas that produced from the pre-crystallised powder alone had in excess of 25% open porosity. The pore diameters in these materials were generally in the range 1 to 10 microns. In all cases, the expansion coefficient of the heat-treated glass-ceramic was 14.5×10$^{-6}$±0.5×10$^{-6o}$ C.$^{-1}$ (20–950° C.).

The glass-ceramic materials which are the subject of the invention have the unusual combination of high thermal expansion coefficient (above 10×10$^{-6o}$ C.$^{-1}$) (20–950° C.) and a high softening point (~1000° C. or above). As such, these materials can be bonded to, and matched in thermal expansion to a range of technologically useful materials such as oxygen ion-conducting and mixed ion/electron-conductiong ceramic membranes in high temperature electrochemical devices (SOFC's, as gas analysers, oxygen separators etc).

In addition to this, the level of open porosity can be tailored to suit specific modes of application. For example, in the case where the glass-ceramic was required to act as gas-tight structural element in a high temperature electrochemical cell (e.g. support frame or gas manifold), open (connected) porosity can be avoided by selection of appropriate processing stages during the fabrication of the glass-ceramic component. If, on the other hand, the glass-ceramic were required to be porous such that permeation of gas through the material was possible (e.g. as a porous support for a ceramic membrane), then modifications to the processing stages could be made to arrive at a glass-ceramic material with a level of open porosity in excess of 20%.

What is claimed is:

1. A process for manufacturing a self-supporting glass-ceramic material comprising, on a weight percent basis, 10–35% MgO, 10–55% BaO and 25–50% SiO$_2$ and possessing a high softening temperature of about 1000° C. or above and a thermal expansion coefficient in excess of 10×10$^{-6}$ °C.$^{-1}$ at 20–950° C., wherein said process comprises:

a) melting glass raw material at a temperature in excess of 1450° C. and the thereby formed melt is cooled rapidly to a temperature below 900° C. and thereafter to ambient temperature to form a precursor glass, b) reducing said precursor glass into a sinterable glass powder with an averaged particle size in the range 1 micron to 100 microns, c) consolidating said glass powder into a green body, with or without organic processing aids, and d) subjecting said green body to a thermal treatment comprising a heating stage of average heating rate not exceeding 100° C./minute between the temperatures of 750° C. and 900° C. to form the glass-ceramic material.

2. A process according to claim 1, wherein the average particle size of said glass powder in b) is 2–50 microns.

3. A process according to claim 1, wherein a pre-crystallised glass powder having the same composition as said glass powder is added to said glass powder from b) prior to formation of the green body.

4. A process according to claim 3, wherein said pre-crystallised glass powder is produced by heating a cooled precursor glass from a) to a temperature in excess of 800° C. to initiate crystallisation, and then reduced as in b).

5. A process according to claim 1, wherein said green body in c) is further heated to a temperature in excess of 900° C. to attain a degree of crystallisation of at least 50 vol %.

6. A process according to claim 5, wherein said green body in c) is further heated to a temperature in excess of 1000° C.

7. A process according to claim 1, wherein the glass-ceramic material contains 0–2.9% by weight of $Al_2O_3$.

8. A process according to claim 1, wherein the glass-ceramic material contains 0–5% by weight of $B_2O_3$.

9. A process according to claim 1, wherein the glass-ceramic material contains 0–3% by weight of $B_2O_3$.

* * * * *